Patented Aug. 18, 1925.

1,550,361

UNITED STATES PATENT OFFICE.

JOSEF HUBER, OF DESSAU, IN ANHALT, AND PAUL ECKERT, OF DESSAU-ZIEBIGK, IN ANHALT, GERMANY, ASSIGNORS TO ACTIEN GESELLSCHAFT FUR ANILIN FABRIKATION, OF BERLIN.

MANUFACTURE OF FINE VISCOSE SILK.

No Drawing. Application filed August 14, 1924. Serial No. 732,110.

*To all whom it may concern:*

Be it known that we, JOSEF HUBER and PAUL ECKERT, citizens of the German Republic, residing at Dessau, in Anhalt, Germany, and Dessau-Ziebigk, in Anhalt, Germany, have invented certain new and useful Improvements in the Manufacture of Fine Viscose Silk, of which the following is a specification.

It is known that by addition of materials resembling sugar, such as glucose and polyalcohols, or albuminoid substances to the spinning bath the feel and softness of artificial silk are improved.

For the same purpose glycerine has been added to the dry cellulose material and it has also been proposed to add to the viscose mucilaginous extracts, such as those obtained from mallow-root and linseed.

By the present invention a new effect is obtained by adding an emulsoid, preferably vegetable mucilage to the lye used for dissolving the xanthate, this effect being different from that obtained by adding the vegetable mucilage to viscose particularly with respect to the gloss, physical characteristics and softness of the artificial silk. The reason for this difference is to be found in the following considerations:

The vegetable mucilages are in general negative colloids which under the influence of a fall of electrical potential wander to the anode and there flocculate. As is known the addition of a charge of like sign produces a change of the degree of distribution of such colloid systems. By adding vegetable mucilage to the solvent lye the degree of dispersity is enhanced. If now the xanthate be added to such a highly disperse system there is obtained after complete dissolution a homogeneous mixture of highly dispersed vegetable mucilage and viscose colloid, a system which is characterized by the transference to the viscose, as a sort of protective effect, of the surprisingly favourable colloid-chemical property of the highly electrically sensitive lyophil. On the other hand, an addition of a vegetable mucilage to viscose can only lead to an unsufficient irregular distribution, so that the phenomena of a mixture are only developed in such a system after long standing and therefore lack of homogeneity is to be observed in the precipitation (spinning) of such a system.

According to the invention an emulsoid, preferably a vegetable mucilage, such as agar-agar, *Cetraria islandica*, *Semen Psyllii*, Laminaria, salep, is added in the form of an aqueous extract of the crude product selected to the lye which is to dissolve the xanthate. The concentration of the mucilage may be ascertained by estimating the dry material which it contains. For example extracts of 1.3–1.5 per cent strength may be used and of such an extract 2–4 parts of weight, calculated on the viscose, may be added to the lye before the xanthate is dissolved. The production of the viscose and the spinning operation follow under the usual conditions.

The silk thus produced has a particularly soft feel, a high degree of toughness, tensile strength and extensibility.

In our companion application Ser. No. 732,109, filed concurrently herewith we have disclosed the addition of inorganic colloids, such as alkali silicates, to the lye in which xanthate is to be dissolved for the purpose of modifying the physical properties of the formed viscose.

What we claim is,—

1. In the manufacture of fine viscose silk having a particularly soft feel, a high degree of toughness, tensile strength and extensibility, adding to the lye in which the xanthate is to be dissolved an emulsoid capable of modifying the physical properties of the formed viscose.

2. In the manufacture of fine viscose silk having a particularly soft feel, a high degree of toughness, tensile strength and extensibility, adding to the lye in which the xanthate is to be dissolved a vegetable mucilage.

In testimony whereof we affix out signatures.

JOSEF HUBER.
PAUL ECKERT.